July 26, 1938.  L. E. LA BRIE  2,124,784

BRAKE

Filed April 28, 1932  4 Sheets-Sheet 1

INVENTOR.
LUDGER E. LA BRIE
BY F. P. Keiper
ATTORNEY

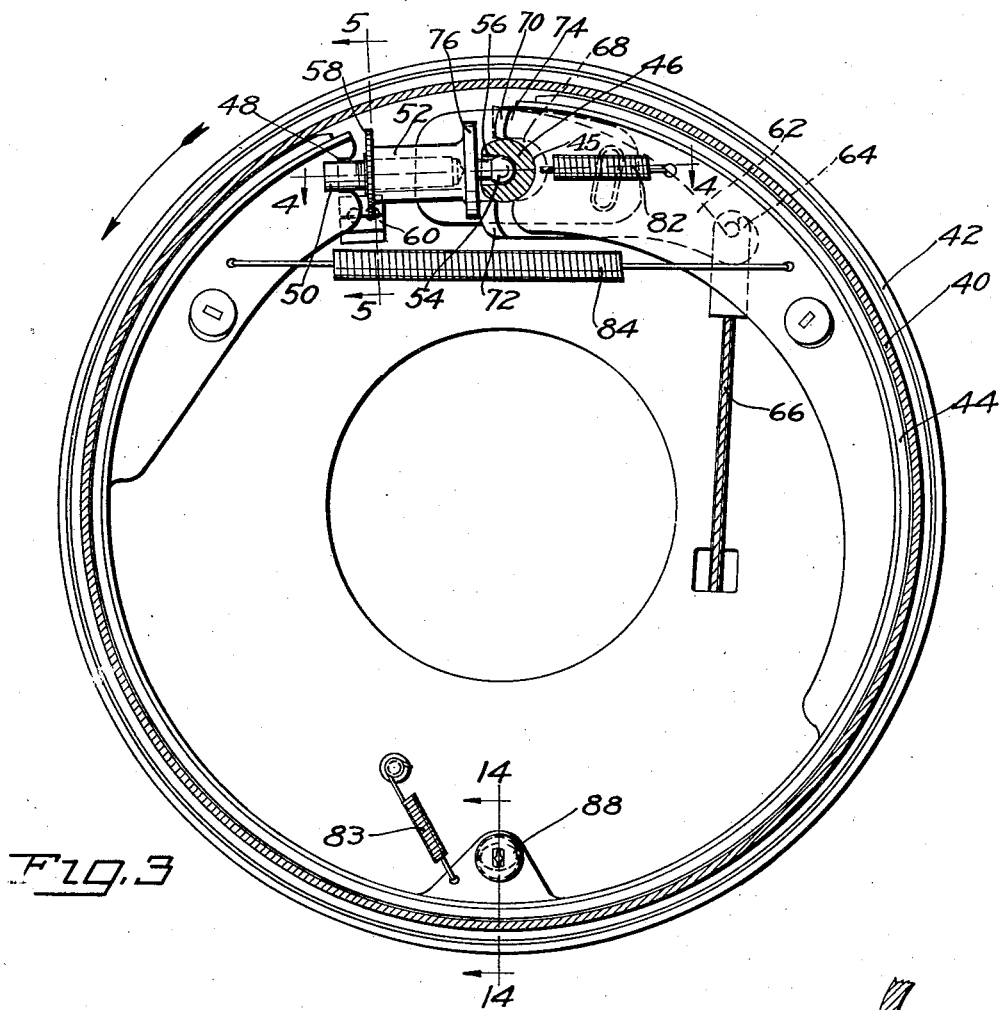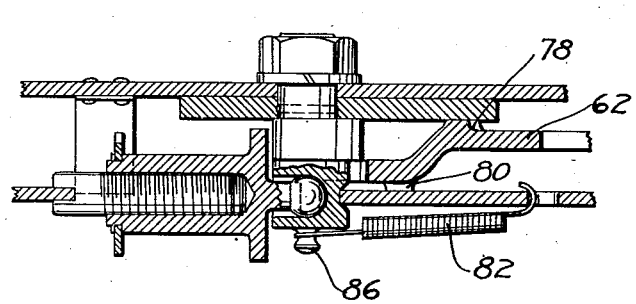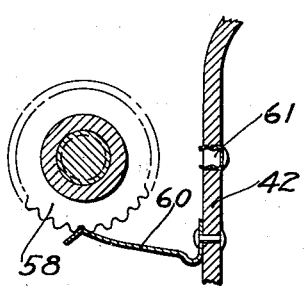

July 26, 1938. L. E. LA BRIE 2,124,784
BRAKE
Filed April 28, 1932 4 Sheets-Sheet 3

INVENTOR.
LUDGER E. LA BRIE
BY
ATTORNEY

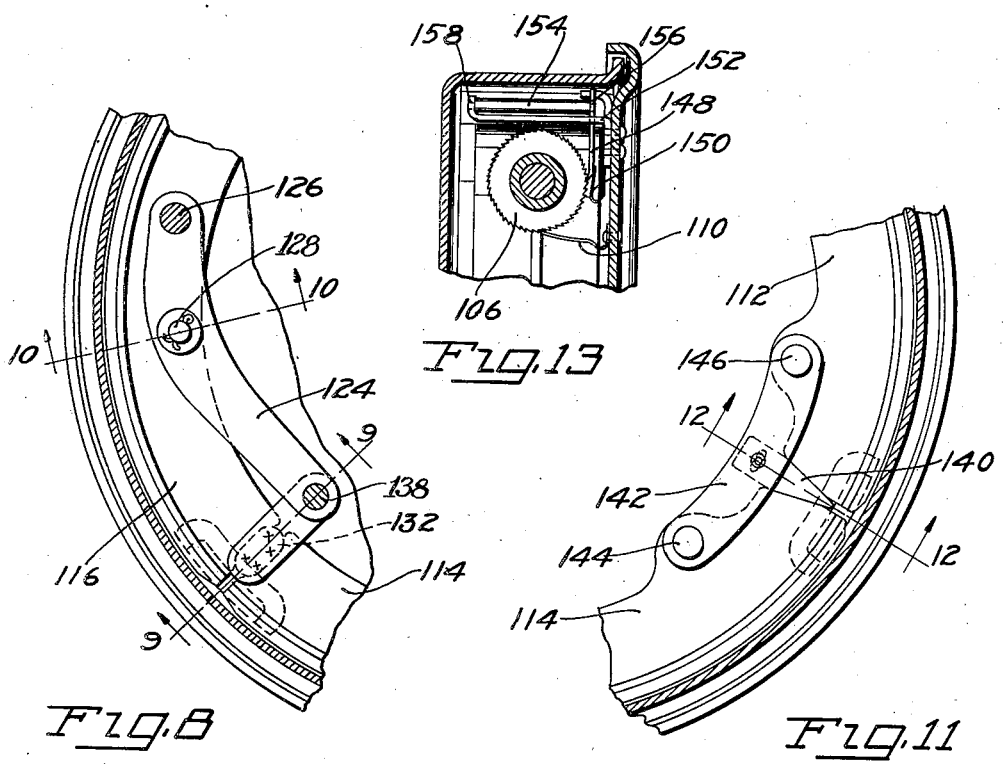

Patented July 26, 1938

2,124,784

UNITED STATES PATENT OFFICE 2,124,784

BRAKE

Ludger E. La Brie, South Bend, Ind., assignor to Bendix Aviation Corporation, South Bend, Ind., a corporation of Delaware Application April 28, 1932, Serial No. 608,101

15 Claims. (Cl. 188—79.5)

This invention relates to brakes, and is illustrated as embodied in a novel system of brakes adapted for use on automotive vehicles, some features being of special advantage in a system of vehicle brakes wherein the adjustment mechanism is located adjacent the anchor and actuating mechanism, such a construction lending itself readily to a one piece shoe; and other features having to do with the adjustment of the brake for wear.

In an automotive vehicle brake, it is of great importance to simplify the construction and reduce the number of parts, thus permitting the strengthening of the fewer remaining parts, and reducing the cost of manufacture. Also since there is constant wear taking place upon the braking surface of brakes in active service, and a resulting necessity of frequent adjustments to take up the wear, there have been developed numerous devices for automatically adjusting brakes which depend upon the brake shoe clearance, the length of movement of the shoe from release position to braking position and other similar movements which take place in brakes and which tend to indicate wear. While all of these developments may be useful, most of them however fail to take into consideration the fact that the drum, upon long continuous use of the brake, heats and expands, often to such an extent that the normal shoe clearance is increased many fold. As a result, the automatic adjustment devices above referred to in general operate to take up the abnormal extra clearance but as soon as the drum cools and contracts, the shoes are found without sufficient clearance and the brakes are caused to drag.

In view of the foregoing, it is an object of this invention to provide a novel automatic adjustment mechanism for brakes free from the defects herein mentioned.

Another object of this invention is the provision of an automatic adjustment mechanism of great simplicity operable only to adjust for excess clearance due to wear.

A further object is the provision of a novel brake construction requiring a minimum number of parts together with a minimum number of adjustments and mechanism for automatically maintaining the brake in proper adjustment.

A still further object is the provision of a self-adjusting and equalizing brake system capable of retaining its adjustment for the life of the brakes.

A still further object is the provision of heat sensitive means in a novel brake construction for the purpose of preventing an adjustment mechanism from functioning except to take up clearance due to wear, this being of particular utility in combination with an automatic adjustment.

A still further object is the provision in a brake mechanism of an automatic adjustment which may be rendered inoperative during heated brake operation.

A still further object is the provision of suitable self-adjusting guide means for a brake having automatic adjustment.

A still further object is to provide an improved brake construction having few parts of rugged design, great simplicity and of reduced manufacturing cost.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings, wherein similar reference characters refer to similar parts throughout the several views:

Figure 3 is a front elevation partly in section of a single shoe brake showing the arrangement of an adjusting mechanism;

Figure 4 is a section of Figure 3 taken on the line 4—4, showing the anchor, actuating, and adjusting mechanism;

Figure 5 is a section of Figure 3 taken on the line 5—5, showing a construction not utilizing automatic adjustment;

Figure 8 shows a modified portion of the brake structure of Figure 6;

Figure 9 is a section through Figure 8 taken on the line 9—9, showing the details thereof;

Figure 10 is a section of Figure 8 taken on the line 10—10, also showing various details;

Figure 11 shows a similar modified portion of the brake structure of Figure 6;

Figure 12 is a section of Figure 11 taken on the line 12—12, illustrating the details therein;

Figure 13 is a section showing details of an improved automatic adjustment mechanism which may be positioned upon the section line 5—5 of Figure 3 or 7—7 of Figure 6.

Figure 1:
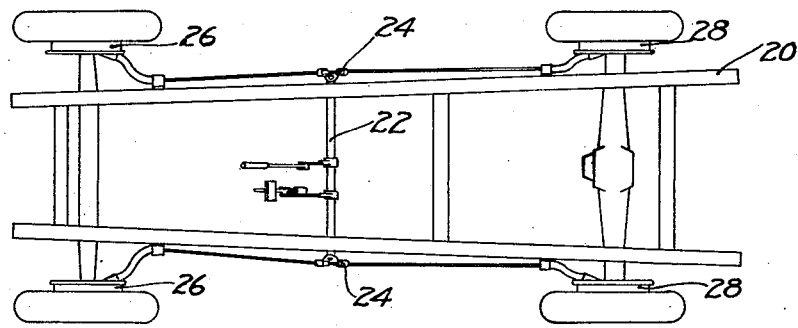
Figure 1 illustrates an improved brake system as applied upon a motor vehicle.
Figure 2:
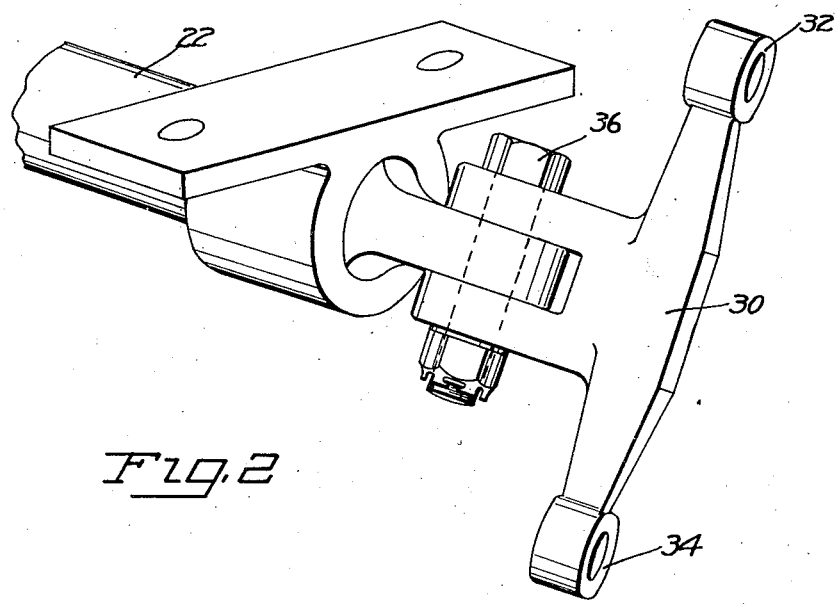
Figure 2 is an enlarged view of an equalizing member utilized in the brake system.

Referring to the drawings more in detail, in Figure 1 there is shown an automotive vehicle 20 having a cross shaft 22, equalizing devices 24, front wheel brakes 26 and rear wheel brakes 28. Each of the equalizing devices 24, as illustrated in Figure 2, comprises a double crank 30 having opposite ends 32 and 34. The double crank is pivoted to the cross shaft 22 by means of a bolt 36 whereby a wrist motion is obtained. Since a front wheel brake may be linked to one end of the double crank and a rear brake to the other end of the double crank and the double crank is free to pivot upon the pin 36 equal pulls will be exerted upon the front brake and the rear brake. Such a construction reduces the necessity for adjustments to a minimum.

A suitable brake for use in the system shown in Figure 1 is illustrated in Figure 3. The brake therein shown comprises a brake drum 40, a backing plate 42 and a single flexible brake shoe 44. A suitable anchor 46 is provided to engage a recessed end 45 of the brake shoe 44. The other end of the brake shoe is notched as shown at 48 to receive a screw 50 which in turn engages a threaded thimble 52, which in turn is provided on its end with a spherical knob 54 adapted to fit in a recess 56 in the anchor 46. Adjustment of the brake shoe may thus be made by rotating the thimble 52 relative to the screw 48, and to prevent movement of the thimble under normal conditions a star wheel 58 may be provided thereon and which may engage a spring pawl 60 of sufficient length to retain its engagement during longitudinal movement of the adjustment mechanism. An aperture 61 may be provided in the backing plate 42 adjacent the star wheel in order to afford access thereto for adjustment purposes, it being readily apparent that a screw driver or suitable tool may be passed through such an aperture and used to pry the star wheel to any desired adjustment.

In order to actuate the brake a lever 62 is provided having a hook 64 and a flexible cable 66 at one end while at the other end of the said lever there is provided a recess 68 adapted to loosely fit around the anchor 46. On either side of the recess are provided bent portions 70 and 72 forming an operating cam, the outer cam portion 70 being adapted to engage the end 74 of the brake shoe 44 while the inner bent cam portion 72 is adapted to engage a smooth flange 76 forming a part of the aforementioned thimble 52. Suitable bosses such as 78 and 80 may be provided on the lever 62 in order to retain the same in its proper position. Suitable springs 82, 83 and 84 may be provided in order to maintain the brake in proper released position and for this purpose a convenient shouldered projection 86 may be positioned on the end of the anchor to afford a connection for the spring 82.

For the purpose of providing proper clearance for the brake shoe in disengaged position it will be readily seen that the anchor 46 in conjunction with the recessed end 45 of the brake shoe 44 may be used to maintain proper clearance over the upper half of the brake shoe and a suitable friction steady-rest 88 may be employed for the purpose of positioning the lower half.

Figures 7, 14:
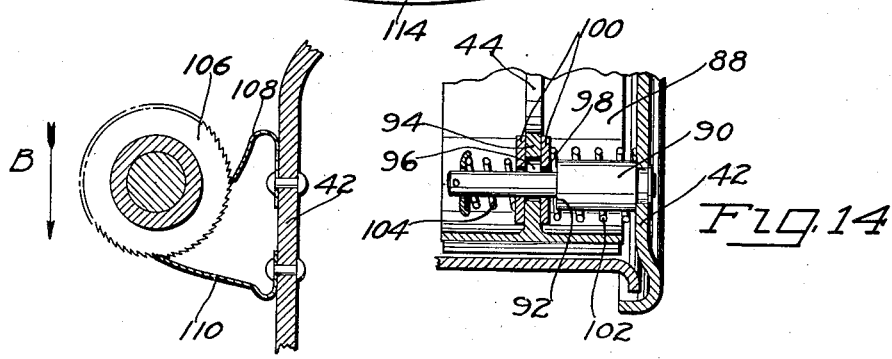
Figure 7 shows a section of Figure 6 taken on the line 7—7, and illustrates a form of automatic adjustment.
Figure 14 is a section of Figure 3 on the line 14—14, illustrating a suitable frictional support for a brake shoe.

In Figure 14 the steady-rest 88 is shown in detail and comprises a fixed pin 90 secured to the backing plate 42 and having a shoulder 92. The brake shoe 44 is provided at this point with a short web 94 having an enlarged aperture 96 through which the pin 90 loosely fits. Positioned on either side of the web and fitting the pin 90 with a clearance 98 equal to that desired between the shoe and the drum, are two friction washers 100 which are pressed into engagement with the web 94 by the resilient springs 102 and 104. The tension of the springs is so arranged as to support the brake shoe in proper position with respect to the backing plate and the shoulder upon the pin 90 is so positioned as to prevent any excessive side motion of the shoe towards the backing plate.

Figure 6:
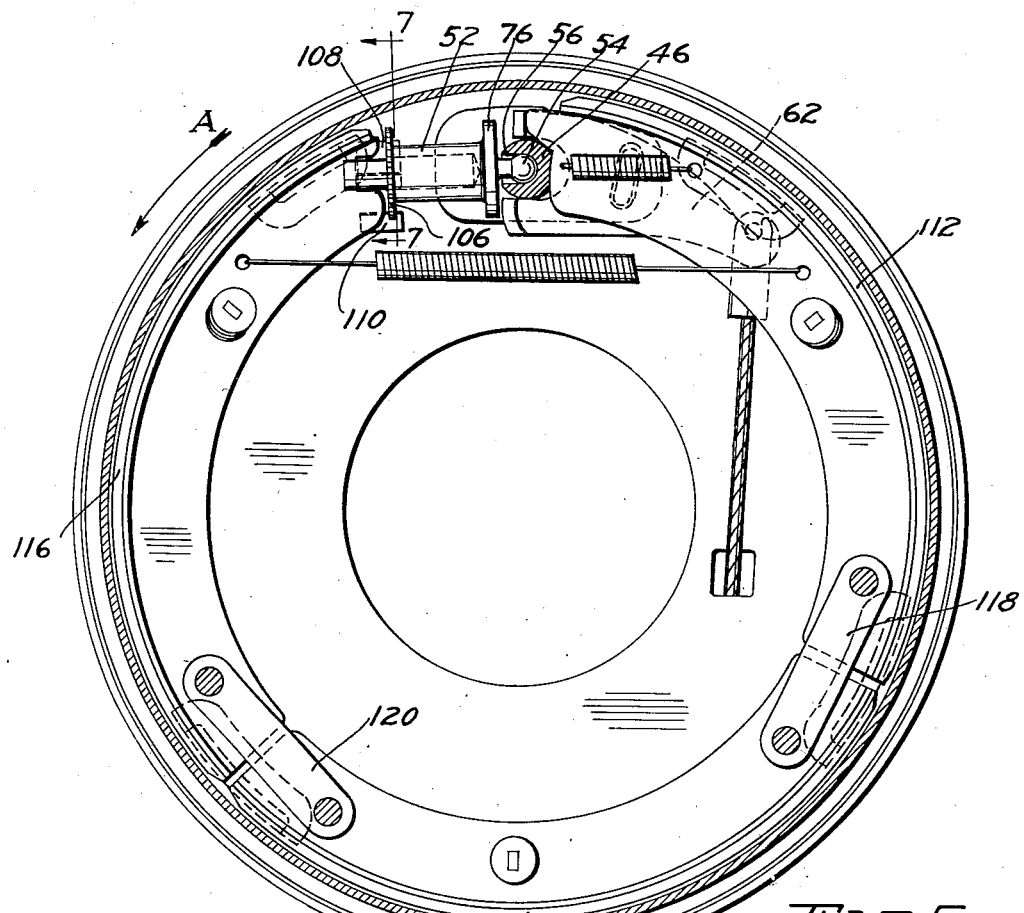
Figure 6 is a front elevation partly in section showing a slight modification of the construction of Figure 3 wherein an articulated shoe is used.

A modified form of the brake shown in Figure 3 is illustrated in Figure 6 wherein the brake shoe instead of being a single flexible band is shown as comprising a plurality of rigid shoes flexibly linked together, so that in effect a similar operation is obtained to that of the structure of Figure 3. In addition to the elements of Figure 3 there is provided in Figure 6 a mechanism for providing an automatic adjustment which is shown in Figure 7. As will be seen the thimble 52 is provided with a toothed ratchet wheel 106 adapted to engage a pair of wide pawls 108 and 110 suitably secured to the backing plate 42. Upon an application of the brake by means of the lever 62 the brake shoes are spread apart through adjusting mechanism upon which the cam end of the lever 62 bears.

Upon drum rotation in the direction of the arrow A and engagement of the brake shoe 116 therewith, counterclockwise rotation of the brake shoes 112, 114 and 116 will take place except as prevented by the engagement of brake shoe 112 with the anchor 46. In this operation the shoe 116 will have considerable movement and the adjusting mechanism will be carried with the shoe 116. Since the cam of the actuating lever 62 bears upon the flange 76, such movement on the part of the adjusting means will be possible by reason of the loose fit of the knob 54 in the recess 56 of the anchor 46. As may be readily seen such an application of the brake causes the left-hand end of the adjusting mechanism to be moved outward and downward and should the movement downward as represented by the arrow B in Figure 7 be sufficient to cause the pawl 108 to engage a new tooth of the ratchet wheel 106, upon the return movement to disengaged position the ratchet wheel will be rotated. The pitch of the teeth upon the ratchet 106 may be so designed that only upon an excessive movement will one tooth pass over the pawl 108 and such excessive movement will only take place upon a certain amount of wear in the brake, and thus there is provided a means for automatically adjusting the brake as soon as wear permits an excessive movement in the actuation of the brake.

Since in prolonged application of the brakes considerable heating takes place, the brake drum expands a large amount relative to the usual clearance provided between the brake shoes and the drum. As the drum is in actual contact with the lining and the shoes are displaced from the point of contact by the thickness of the lining which is a good heat insulator the drum becomes more highly heated than the shoes and as a result thereof the expansion of the drum is not neutralized by a corresponding expansion of the shoes. According to an important feature of the invention, in order to prevent the automatic adjusting mechanism from functioning because of the increased clearance during heating there is provided compensating means such as links 118 and 120 (Figure 6) which may be of any suitable length and which are constructed of a metal such as aluminum having a very high coefficient of expansion. By this means, the brake shoe may be caused to expand an amount commensurate with the expansion of the brake drum, for various materials and various lengths may be used in designing the connecting strips for any desired effect. Such strips may be employed to make up for the smaller amount of expansion of the brake shoe relative to the brake drum and when properly constructed will cause the brake shoe to expand and maintain a fairly uniform clearance between the drum and the shoes regardless of what temperature the drum may attain. Such expansion prevents the actuation of the automatic adjusting means to compensate for any clearance other than that due to wear, since the brake shoes follow the drum in expanding and prevents any abnormal clearance such as would cause the automatic adjustment mechanism to operate.

In Figure 8 there is shown a modification of the construction of Figure 6 wherein a cam 132 is provided between the ends of the shoes 114 and 116 and which cam is caused to rock by the link 124 which link is made of a material of either higher or lower coefficient of expansion than that of the brake shoe. As may be seen in Figure 8 the link 124 is pivoted to the brake shoe at 126 and is guided as shown in Figure 10 by a pin 128 loosely fitting through an aperture 130 in the web of the brake shoe 116. As shown in Figure 9 the construction of the cam consists preferably of a cam portion 132 spot-welded or otherwise suitably secured between two side plates 134 and 136 and pivoted to the expansion link 124 by the pin 138. The thickness of the cam 132 is substantially the width of the brake shoe but may be made wider should it be advisable to reinforce the web thickness at this point.

Another means for producing additional expansion in the brake as shown in Figures 11 and 12 wherein a wedge 140 is shown pivotally secured to a link 142 which in turn is secured to the adjacent shoes 112 and 114 by pivot pins 144 and 146. The links 142 may be made of bimetallic material having a lower coefficient of expansion on the inside of the curve in order to cause an increase in curvature of the strip upon heating thereof to drive the wedge further between the shoes. It will be readily observed that one of the pivots 146 or 144 may be slotted so as to permit movement of the shoe should the materials used in the expansion link have insufficient expansion to compensate for the wedge movement. The link 142 may also be of a metal having an exceedingly high coefficient of expansion, since expansion of such a link tends to increase the radius of curvature which in turn will drive the wedge 140 between the shoes 112 and 114 to expand the same.

In Figure 13 there is shown a thermal sensitive mechanism associated with one of the pawls which act upon the ratchet wheel described in connection with Figure 7, to render the pawl inoperative during heated brake operation and for the purpose of attaining a similar result accomplished by the various expansion links disclosed.

To provide for forward rotation and adjustment a pawl 148 is provided which is resiliently held in engagement by the spring 150, as explained in connection with Figure 7, and upon sufficient downward movement of the adjusting mechanism assembly the pawl 148 will pass over a tooth of the ratchet wheel 106. Should the drum expand considerably without compensating means in the brake shoes a single actuation of the brake might even cause the pawl to skip over two or three or even more teeth since the clearance under heating conditions is excessive. For this reason there is provided a frame 152 which may be of metal of low coefficient of expansion and a thermostatic element 154 which is preferably a material of high coefficient of expansion. As may be seen the pawl 148 is pivoted at 156 in the frame 152 and carries one end of the expansion element 154. The other end of the expansion element is carried in the frame as shown at 158, so that upon expansion of the element 154 with respect to the frame the pawl 148 is swung to the right against spring 150 and out of engagement with the ratchet wheel 106 thus preventing any adjustment taking place during the heating of the brake. It will be understood that the thermal element 154 is located as close to the drum as possible, so that it may be quickly heated by radiation and other means of heat transfer therefrom.

It will be readily understood that the various modifications shown herein may be combined, for example, the brake construction of Figure 6 having the links of high expansion coefficient may be combined with the thermostatic control mechanism shown in Figure 13. In such a combination the expansion links may be used to prevent excessive clearance being caused by the heat expansion of the drum, whereas the thermostatic cut-out will operate to prevent further adjustment should the connecting links 118 be designed so as to not completely compensate for the drum expansion.

In operation of the brake system it will be readily seen that upon depressing the pedal shown in Figure 1, the cross shaft 22 will be rotated carrying the double cranks located at either end thereof. The pivotal connection 36 between the cross shaft and the double cranks willl permit equalization and create an equal tension on the forward and rearward brakes. Such an application will exert a pull on the cable in each of the brakes shown and will rock the lever 62 spreading the shoe and the adjusting means by the action of a bent cam portion 70 and 72 on the end of the lever. If rotation is in the opposite direction from the direction of the arrow A the brake shoe will anchor through adjusting mechanism 52 and the knob 54 recessed in the anchor. During this operation a slight upward movement will take place of the ratchet wheel 58, nearly equal to the clearance of the brake shoe which clearance will seldom amount to the pitch of a tooth; accordingly, the automatic adjustment feature may be considered inoperative during rotation in this direction unless particularly designed with a tooth pitch on the ratchet wheel which is exceedingly fine. Rotation in the opposite direction carries the left-hand end of the brake shoe with the drum anchoring against the anchor 46 in the right-hand end of the shoe. In this motion considerable movement takes place by the adjusting mechanism and the same is designed, so that upon excessive movement, the pawl will clear a tooth. Should there be a nonautomatic adjustment such as shown in Figure 5, the star-wheel 58 will rock during brake actuation due to movement relative to the pawl 60, but no adjustment or permanent rotation will take place.

During brake application the frictional support, shown in Figure 14 in detail, operates to guide the shoe upon the opposite side from the anchor. In applying the brake the shoe is forced into contact with the drum and carries with it the washers 100 which frictionally engage the web when the clearance 98 in the washers is used up. Further application of the brake causes sliding between the washers and the web of the brake shoe. Upon release of the brake the washers frictionally engage the web and permit a retracted movement thereof in accordance with the clearance provided as shown at 98 thus regulating the brake shoe clearance when in released position.

As has been pointed out the expansion links 118 serve to make up for the lower temperature present in the brake shoe during extended brake application and heating thereof and may be suitably designed for any desired amount of compensation. The thermal cutout shown in Figure 13 may be also designed to act upon any temperature which may be desired. Since the thermal element therein depends upon heat radiation mostly it is preferable to place the same as near the drum as possible and to permit the element to cut out the pawl 148 at a relatively low element temperature since the drum may attain a high temperature before the thermal element has been greatly heated.

While embodiments and modifications of the invention have been illustrated and described it is to be understood that the invention is not limited thereto but may be embodied in various mechanical forms; for example, as has been pointed out the various features may be combined into one unitary structure thus deriving the advantages of both constructions. As such changes in construction and arrangement of parts may be made without departing from the spirit of the invention as will be well understood by those skilled in the art, reference will be had to the appended claims for a definition of the limits of the invention.

I claim:

1. A brake comprising a drum, friction means therein having separable ends, an anchor between said ends, one of said ends adapted to engage the anchor and the other of said ends being spaced from the anchor, an adjusting screw and threaded sleeve having a smooth flange adjacent the anchor located between said anchor and said other end, and an actuating cam floating on said anchor and adapted to spread said sleeve and said flange adjacent said anchor.

2. A brake comprising a drum, friction means therein having separable ends, an adjustment for said friction means having a longitudinally and tangentially arranged screw and sleeve adapted to move radially on brake applications, a ratchet to rotate said sleeve relative to said screw, a resilient pawl secured to said backing plate and contacting said ratchet at a point substantially on a line passing through the ratchet center and parallel to the backing plate to permit one way rotation, a second pawl to rotate said ratchet upon radial movement thereof during disengaging the brake, and means to disengage the second pawl from the ratchet wheel upon substantial heating of the drum.

3. A brake comprising a drum, a friction means therein, said friction means comprising separate shoes, means connecting said shoes to provide heat expansion of said friction means commensurate with heat expansion of the drum, and automatic adjusting mechanism therefor.

4. A brake comprising a drum, friction means therein comprising adjacent shoes, a cam between said shoes, means responsive to heat to rock said cam and spread said shoes and to expand said friction means an amount substantially equal to the drum heat expansion.

5. A brake comprising a drum, friction means, a single anchor adapted to engage one end of said friction means and recessed to slidably receive a swivel end of an adjustment mechanism.

6. A brake comprising an anchor having a recess therein, a friction shoe, an adjusting link engaging said shoe and slidably and swivelly extending into said recess.

7. A brake comprising an anchor having a recess in one side, and friction means having at one end an adjustable part having a rounded end seated in said recess and engaging the anchor at the other end of the friction means.

8. A brake comprising an anchor having a recess in its side, and a friction shoe engaging said anchor at one end and an adjusting link at the other end, said adjusting link having a thrust part adapted to engage said anchor and be seated in said recess.

9. A brake comprising a drum, friction means therefor, an automatic adjustment mechanism, and means to frictionally support said friction means comprising a fixed stud, opposed resilient members on said stud, and an apertured member fixed to said friction means and located on said stud between said opposed members.

10. Brake friction means comprising shoes having a relatively low coefficient of expansion due to heat connected by means having a high coefficient of expansion due to heat.

11. Brake friction means comprising shoes faced with a heat-insulating material forming a friction lining and formed of a material having a low coefficient of expansion due to heat, and connected by means having a high coefficient of expansion due to heat.

12. Brake friction means comprising shoes connected by links of a material whose coefficient of expansion due to heat is relatively high as compared to that of the shoes under normal braking conditions.

13. Brake friction means comprising steel shoes connected by links of aluminum.

14. Brake friction means comprising shoes connected by links of a material whose coefficient of expansion due to heat is relatively high as compared to that of the shoes under normal braking conditions, and having shoe-spreading means actuated by expansion of said links.

15. Brake friction means comprising shoes connected by links of aluminum, and having shoe-spreading means actuated by expansion of said links.

LUDGER E. La BRIE.